(12) United States Patent
Romero

(10) Patent No.: US 10,365,346 B1
(45) Date of Patent: Jul. 30, 2019

(54) LOW PROFILE MULTI-AXIS STAR SENSING

(71) Applicant: Kevin J. Romero, Claremont, CA (US)

(72) Inventor: Kevin J. Romero, Claremont, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 114 days.

(21) Appl. No.: 15/624,462

(22) Filed: Jun. 15, 2017

(51) Int. Cl.
  *G02B 27/00* (2006.01)
  *G01S 3/786* (2006.01)
  *G02B 27/28* (2006.01)
  *G02B 26/08* (2006.01)

(52) U.S. Cl.
  CPC ........ *G01S 3/7867* (2013.01); *G02B 26/0816* (2013.01); *G02B 27/286* (2013.01)

(58) Field of Classification Search
  CPC .. G02B 26/0816; G02B 27/286; G01S 3/7867
  USPC ................ 250/203.1, 203.3, 203.6
  See application file for complete search history.

(56) References Cited

U.S. PATENT DOCUMENTS

| | | | | |
|---|---|---|---|---|
| 3,015,249 A | * | 1/1962 | Taylor | G01S 3/7867 250/203.6 |
| 5,600,123 A | * | 2/1997 | Purrazzella | G01C 21/16 250/203.3 |
| 6,057,915 A | * | 5/2000 | Squire | F41H 13/00 356/139.05 |

* cited by examiner

*Primary Examiner* — Kevin K Pyo
(74) *Attorney, Agent, or Firm* — Tarolli, Sundheim, Covell & Tummino LLP

(57) ABSTRACT

A small, ultra-light-weight star tracker for space applications uses an out-of-field rejection filter to reduce the physical size and mass of the star tracker by effectively eliminating the need for a sun shade. The out-of-field rejection filter combines a converter for converting randomly polarized light to p-polarized light with an angular selectivity filter that can reject out-of-field p-polarized light. The underside of the angular selectivity filter can be used to reflect a calibrated light source into the optical path.

20 Claims, 17 Drawing Sheets

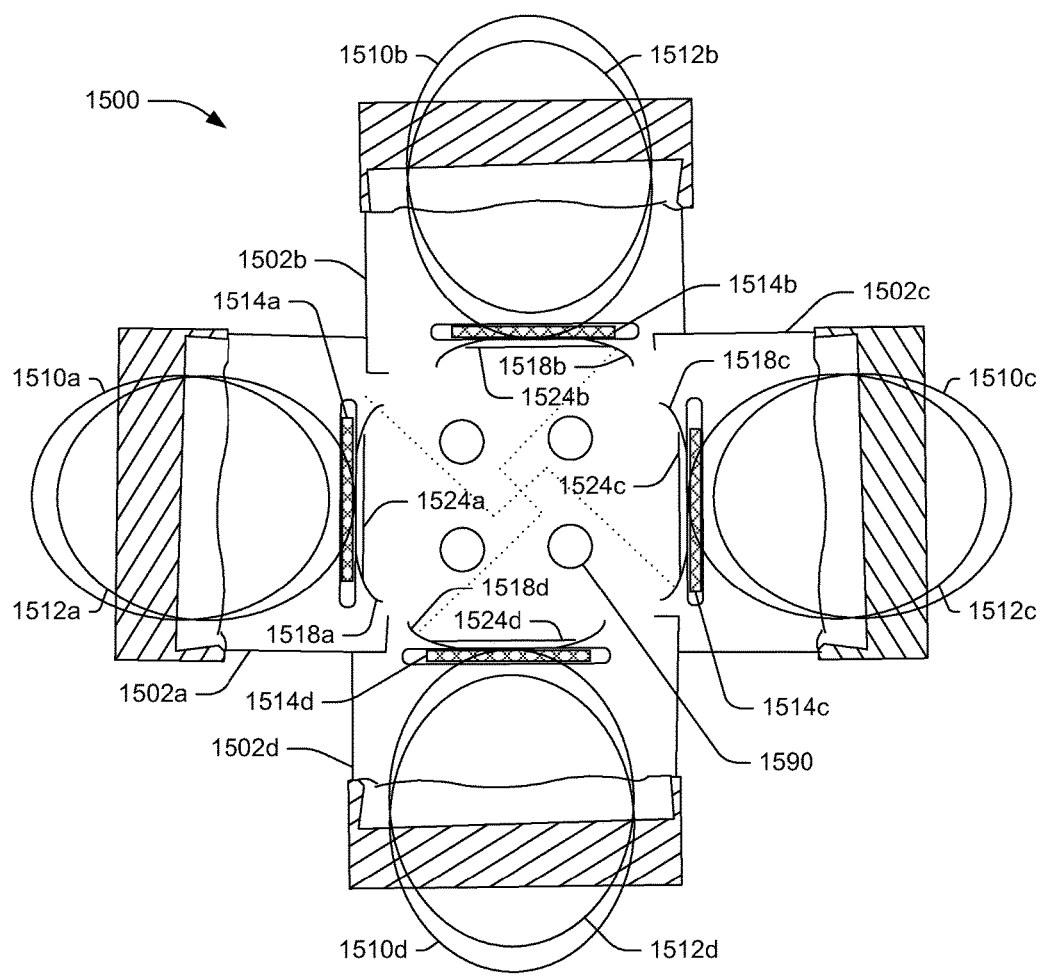
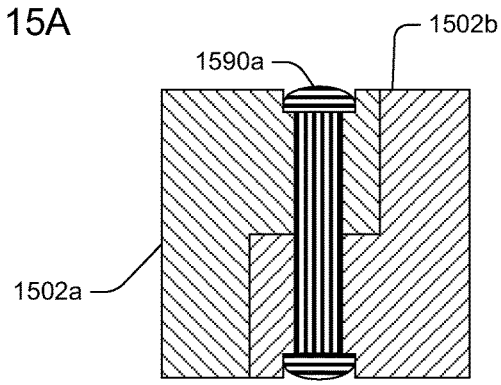
FIG. 15A
FIG. 15B

LOW PROFILE MULTI-AXIS STAR SENSING

TECHNICAL FIELD

The present invention relates to systems and methods for sensing stars. Particularly, the present invention relates to star trackers as may be used for navigation in satellites and other craft.

BACKGROUND

A star tracker determines the bearing and elevation of one or more known stars. Information from two or more known stars can yield the position of the star tracker and thus can provide position data to an associated navigation system as may be used, for example, on maritime craft, aircraft, spacecraft, or satellites. Many star trackers comprise telescopes that make use of sun shades to shade the star tracker field-of-view from stray light coming from the Sun, Earth, or Moon, to provide a view of needed reference stars that is unadulterated by out-of-field radiation.

SUMMARY

In one example, there is provided a star tracker having an out-of-field rejection filter (OFRF). The OFRF can include a converter to convert randomly polarized light to p-polarized light, and an angular selectivity layer to select in-field p-polarized light and reject out-of-field p-polarized light. The star tracker can therefore be sunshadeless, or can have only a very small sun shade. The star tracker can include telescopic optics and a focal plane array to resolve the selected light. The star tracker can further include an adaptive optical element (AOE) arranged to reduce centroiding error by adjusting focus of, or reducing aberrations in, selected light. An interior side of the angular selectivity layer can be reflective to s-polarized light and can be arranged to reflect light from a calibration source within the star tracker to be resolved on the focal plane array. The telescopic optics can be diamond-turned optics.

In another example, there is provided a multi-axis star tracker package having a base, at least three star trackers mounted to the base, each having a boresight. Each star tracker can have an out-of-field rejection filter made of a converter to convert randomly polarized light to p-polarized light and an angular selectivity layer to select in-field p-polarized light and reject out-of-field p-polarized light; telescopic optics; and a focal plane array to resolve the selected light. The boresights of the star trackers can be arranged such that the star trackers have substantially non-overlapping fields of view.

In yet another example, there is provided a method of star tracking including admitting light to a star tracker having an attitude; converting randomly polarized light in the admitted light to p-polarized light; angularly selecting the p-polarized light to reject out-of-field light; resolving the selected light on a focal plane array; and determining the attitude of the star tracker based on the resolved light.

BRIEF DESCRIPTION OF THE DRAWINGS

FIG. 15A is an overhead cross-section of an example four-star tracker package arrangement, while
FIG. 15B is a side-view cross-section of an example connection between star trackers in the package.

DETAILED DESCRIPTION

Figure 1:
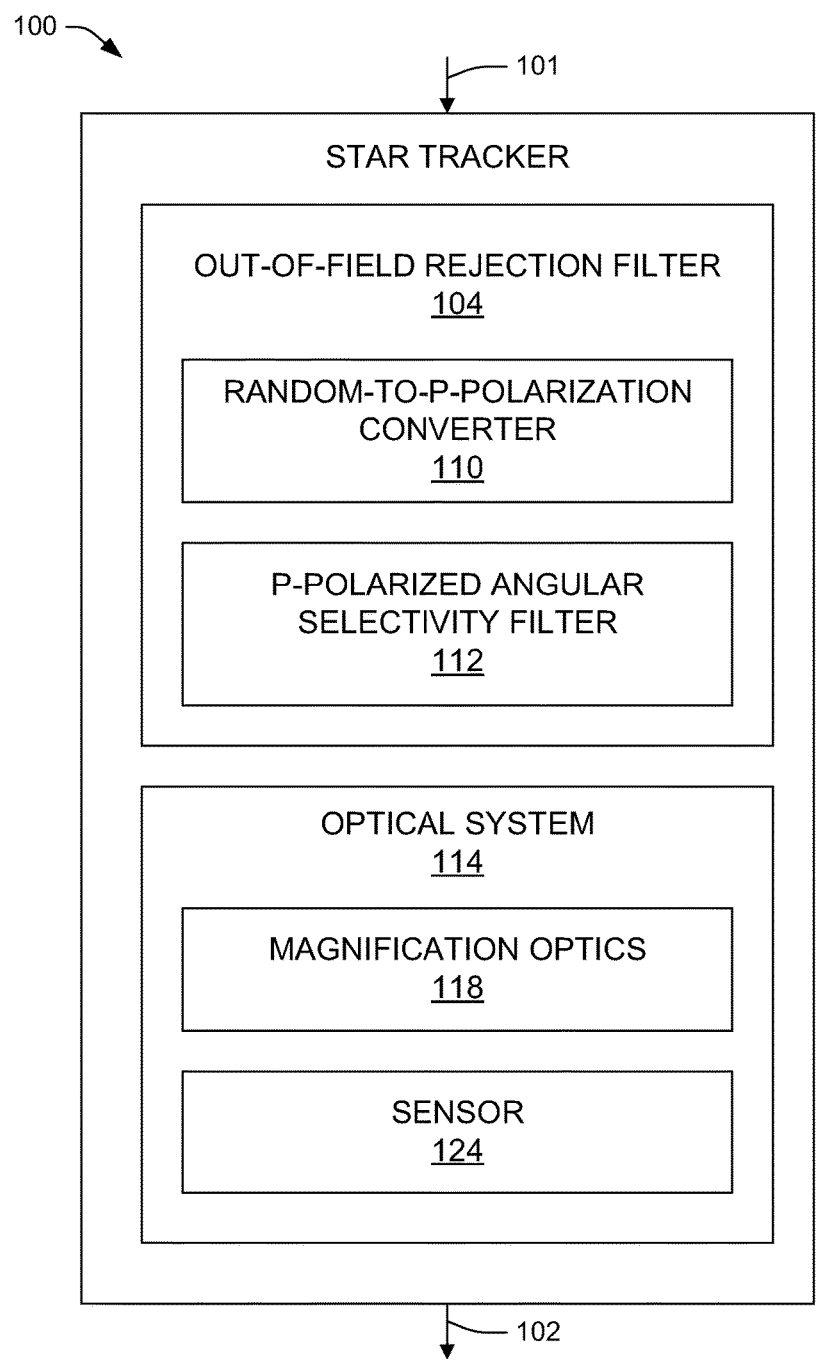
FIG. 1 is a system diagram of a star tracker.

"Operational window" describes the set of star tracker orientations for which the star tracker and its associated systems can successfully determine an attitude from acquired visuals of stars. The utility of a star tracker is enhanced by a wider operational window, but operational windows are narrowed particularly by stray bright light. A major source of such stray light can be, for example, the Sun, Earth, or Moon. A star tracker can stop functioning when it is pointed at or near the Sun, for example. "Out-of-field rejection" describes the reduction of unwanted stray light from entering the optical path of a star tracker.

Star trackers can employ bulky sun shades for out-of-field rejection. Such sun shades are commonly cone-shaped and are often required to be very long in order to provide adequate stray-light rejection. For example, a sun shade for an 8.75-centimeter aperture star tracker with a 9° field of view and a 5° exclusion angle (measured relative the maximum field angle) can be about a meter in length. The standard length L of a sun shade is dependent on aperture $D_0$, field of view $2\Omega$, and exclusion angle $\chi$, as described by the sun shade length equation $$L = D_0/(\tan(\Omega+\chi) - \tan(\Omega)), \chi > \Omega$$

In addition to adding weight and bulk to the craft employing the star tracker, and thus to the cost of the craft's launch or other transport, a long sun shade can also store mechanical energy, which can contribute to undesirable jitter in the system, impacting the "first mode" of the star tracker and that of other jitter sensitive elements on the system.

The present disclosure introduces an out-of-field rejection filter (OFRF) to perform the function of out-of-field rejection and thus eliminate or substantially reduce the need for, and/or the size of, sun shades in a star tracker. The OFRF can be tilted through an angle ft, so that rays along the boresight of the star tracker are incident at the effective Brewster's angle, ft of the OFRF. When the OFRF is oriented in this way, the minimum total length of the OFRF housing above a star tracker entrance aperture is given by the sun shade length equation above, with the baffle exclusion angle replaced by $\chi_{off}=\beta-\Omega$. The actual exclusion angle is determined by the design of the angular selectivity filter, and the allowable attenuation as a function of field angle for the star-tracker based on performance modeling.

In some examples, the star trackers employing the OFRFs of the present disclosure have housings less than 10% of the standard length of a traditional sun shade, i.e., as given by the sun shade length equation above. The size of the housing is dependent on the effective Brewster angle $\beta$ of the angular selectivity filter and the field of view of the telescope while the length of the traditional sun shade depends on field of view and the exclusion angle. For angular selectivity filters made from optical materials whose effective index of refraction ranges from 1.43 to 2.35, the OFRF housing can be between 4% and 7% the size of a traditional shade using typical exclusion angle values (of about 5.7 degrees) and FOVs ranging from 1 to 8 degrees.

The OFRF can act as a scattering surface, and so it is possible to extend the housing to form a short sun shade in front of the device to improve performance by reducing the total amount of scattered p-polarized light that might enter the tracker. The length of this shade is determined by the allowed exclusion angle which is driven by the mission profile for which the star tracker is used and allowable amount of scattered light. The amount of light scattered into the star tracker is dependent on the polarized bi-directional transmission function. Making the first surface high polished with an anti-reflective coating can limit unwanted scatter from the OFRF. Although only scattered light that enters the FOV and is p-polarized will raise the background level of signal on the focal plane (i.e., will contribute to noise as diffuse light), a small sun shade can be added to reduce the background to an acceptable level in order to address light that meets the criteria. The term "sun shade" as used herein will be understood to include any extended star tracker housing that effectively forms a sun shade.

Thus, in some examples, the star tracker can include a sun shade having a length less than 80% the standard length of a sun shade, as described by the above sun shade length equation. In some examples, the star trackers employing the OFRFs of the present disclosure have sun shades less than 50% the standard length of a sun shade, for example, less than 20% the standard length of a sun shade, for example, less than 10% the standard length of a sun shade. In some examples, the star trackers employing the OFRFs of the present disclosure have sun shades less than 20 centimeters in length, for example, less than 10 centimeters in length, for example, less than 5 centimeters in length. In any of these examples, such shades can also serve to partially house the OFRF. In some examples, the star trackers have no sun shades other than the housing used to contain the OFRF.

A star tracker equipped with one or more OFRFs can have an extended operational period as compared with star trackers equipped only with sun shades for out-of-field rejection. Elimination or size reduction of traditional sun shades allows stiffer systems, i.e., improved first mode at higher resonant frequencies. Provided herein are star trackers of reduced volume and mass and improved manufacturability, that can have a wider operational window. Associated methods are also provided herein.

An OFRF can include a high-efficiency converter that can convert randomly polarized light to p-polarized light. The OFRF can then further include an angular selectivity filter capable of rejecting p-polarized light by angle of incidence. In some examples, these two elements of the OFRF can be mounted to have some angle of separation with respect to each other, e.g., 55° for a particular choice of optical materials for angular selectivity. In other examples, these two elements can be mounted to each other directly or otherwise mounted to be flush with each other, without loss of functionality, further reducing the size of the star trackers in which they are used, and further reducing the impact on first mode of the star tracker. In some examples, a small motor or other actuator can be provided to rotate the angular selectivity element so that it is pointed relative to a bright source for maximum selectivity effectiveness. In other examples that combine multiple star trackers in a single package, the result from a particular star tracker can be discounted when it is in an unfavorable position relative to a bright source.

The star trackers described herein can further include a calibrator or calibration controller and accordingly can operate to calibrate for changes in the optical properties of the star tracker's optical system as may result, for example, from thermal variations. A calibrated light source can be placed within the star tracker to make use of a property of the OFRF's angular selectivity layer, the underside surface of which is reflective to s-polarized light. When the calibrator includes an s-polarization converter, or when the calibration source otherwise produces only s-polarized light, the calibration signal light differs in polarization from the light admitted by the p-polarizing OFRF, and the two signals therefore are distinguishable. The reflective underside of the OFRF can be used to reflect the calibrated light source, i.e., in-band calibration flood source, allowing for continuous or periodic calibration without moving parts, thereby improving the ability to identify stars and monitor performance. The calibrator and associated methods simplify determination of which stars the star tracker should be seeing at any given time.

The star trackers described herein can further include an adaptive optical element (AOE) to perform wavefront correction on selected light prior to resolving on a sensor. The AOE can perform minor corrections to the image due to thermally induced distortion, mechanical creep, and reduce residual geometrical 3rd-order aberrations when a star lies near the edge of the field of view. AOEs can be or include MEMS-based deformable mirrors, photo-controlled deformable mirrors, digital micromirror devices (DMD)s, and forms of actuated deformable mirrors. The exit pupil where AOEs are to be placed constrains the required clear aperture of the AOE technology selected. The incorporation of an AOE permits the use of star-sightings to improve imaging. Star-sighting information can be used to reduce centroiding error, by adjusting the "focus" or reducing other aberrations around a star, thereby improving attitude determination. The AOE permits for stepping through multiple optical configurations, allowing the system to collect sufficient light field information to be able to dynamically adjust for nearby objects and otherwise optimize imaging. Hence, the star trackers described herein can effectively operate as light field cameras.

The star trackers described herein can further include a sensor to transduce incoming light to an electrical signal, e.g., a focal-plane array (FPA), which can comprise, for example, one or more active pixel arrays or charge-coupled devices (CCDs) to transduce light to an electrical signal. The resultant electrical signal can be processed and analyzed to determine, e.g., a position, an attitude, a quaternion, or other useful navigational output. Such processing can be performed by a general purpose microprocessor and/or special-purpose star tracker processing circuitry, which may be located within the star tracker or elsewhere in the satellite or craft in which the star tracker is installed. As such, in the descriptions of the appended illustrations, processing circuitry is not shown or described, but processing circuitry can be part of any of the star trackers described herein. FPAs can have pixel counts in either the row or column that are simple factors of 2, e.g., 256, 512, 1,024, 2,048, 4,096, 8,192. The physical size d of the FPA in a given dimension is the product of the detector element count or pixel count c and detector element size p, also known as the pixel pitch:

$$d=cp$$

The optics of the star trackers described herein can be snap-together diamond-turned optics, which can be fabricated, for example, of low coefficient of thermal expansion (low CTE) diamond turnable material, such as beryllium or a beryllium-aluminum metal matrix composite material (e.g., ALBEMET). The AOE, calibrator, and FPA can be insertable prior to pinning. By using diamond turning, and simple incorporation of other optical elements, the star trackers of this disclosure can have improved manufacturability.

Individual star tracker devices having an OFRF may be limited in their field of view (FOV) (e.g., to an 8° FOV) due to the OFRF. However, tacking multiple light-weight star trackers in a single package can provide an ultra-wide FOV useful for precision attitude determination. Unlike with star tracker systems that must rely on bulky sun shades, the compact size of the OFRF allows multiple (e.g., 2, 3, or 4) star trackers to be packaged together in a single, compact unit with a shared optical bench. Such a unit can sample multiple boresight vectors simultaneously, enabling an improved attitude determination. The effect of this approach is similar to increasing the FOV, but has the advantage of maintaining the benefits of narrow-field high resolution imaging for star sightings.

Several different examples of star trackers are provided that each use an OFRF for stray light mitigation. Some of the examples further include adaptive optical elements and offer a useful calibration source position. Each example has a particular focal ratio. This focal ratio, along with choices of design wavelength and optical metric, determines the optimal detector size for star tracker operation. The physical size d of the chosen FPA is selected so that the FOV of the star tracker is equivalent to that necessary for angular selectivity, to selectively pass light within the FOV of the star tracker (about ±4.5°). As noted above, given the physical size d of the FPA and the detector element size p, the detector pixel count c necessary for the star tracker can be determined. The detector count c multiplied by the detector element size p is equal to the required physical size d of the FPA as determined by the FOV determination. Using available FPAs with the required detector element size p allows a family of star trackers to be defined, each with a focal length f determined by focal plane availability. Given the focal ratio N and focal length f of a particular star tracker, the associated aperture size $D_0$ required for each example can be determined.

The various example star trackers illustrated in the drawings and described herein can have different focal ratios, also known as f-numbers, and detector sizes. The focal ratios of the illustrated example star trackers can be modified to match a selected FPA size and resolution and a FOV for the star tracker. For each example, the relationship between the FPA resolution and focal ratio can be dictated by a design function, or optical metric, as defined by the equation $$Q=\lambda N/p$$

where λ is the design wavelength, which can be chosen, for example, to correspond to the wavelength of G-type stars to be observed (λ~0.5 micrometers), N is the focal ratio, also known as the f-number, of the telescope used for the star tracker, and p is the detector element size. For any particular application, the optical metric Q can be selected based on star tracker performance modeling which can be based on available focal planes and detector sizes. Choosing such a function defines the optimal pixel size for focal plane arrays for star trackers with a particular focal ratio. For example, an optical metric that provides a good compromise between sensitivity and the ability to centroid stars to establish their location is Q=0.44.

The OFRF serves to define the maximum operational field of view of the star tracker, which in some examples is between 4° and 8°. Selecting an existing FPA with pixels of size p defines the physical size d of such an array. The physical size d of the FPA, along with the FOV of the star tracker, defines the focal length f of the telescope, and, along with the focal ratio N, the operational aperture, also called the entrance pupil diameter, $D_0$ of the star tracker. Physically larger FPAs will result in physically larger star trackers. Modifying the physical size d of the array, but keeping the detector element size p invariant, scales the star tracker to be larger or smaller. Selecting the FPA size d permits the adjustment of the size of the star tracker so that all useful features such a sun shutters, AOE, OFRF, and calibrators will fit within the housing that contains the star tracker. Some AOE technologies are more easily incorporated into specific telescope designs. With advances in CMOS active pixel backside illumination (BSI) technology, pixel pitches on the order of a micrometer may be available for star tracker applications.

When the FPA is constrained to a certain physical size d and the FOV for which the OFRF will operate is constrained to 8.5° or less (e.g., because of the design of the angular selectivity filter), the telescope focal length f can be determined, and thus the aperture $D_0$ required for a particular telescope design choice can be derived based on the focal ratio N:

$$f \ge d/(2 \tan(FOV/2))$$

$$D_0 \ge d/(2N \tan(FOV/2))$$

The sizes of practical components available for the construction of the star trackers disclosed herein may present sizing constraints for the star trackers. Because the size of the OFRF's random-to-p-polarization converter may in practice be limited to about 10 centimeters, the size of the telescope aperture $D_0$, which must be no larger, may be similarly limited. Adaptive optical mirrors with an aperture of about 5.08 centimeters, called photo-controlled deformable mirrors (PCDMs) are under development, though many adaptive optical element technologies are much smaller than this. The PCDM would require the ability to image an intensity pattern of light representing the correction to be made on the AOE, meaning that a star tracker employing a PCDM would need to be sized to accommodate the ability to illuminate the PCDM appropriately.

FIG. 1 is a system diagram of a star tracker 100 having an input 101 and an output 102. The input 101 can include light from distant stars desired for producing the useful output 102 and may further include undesired stray light, i.e., out-of-field light, from one or more bright sources that should be filtered out in order to produce a useful output 102. The output 102 can be, for example, an electrical signal representative of light resolved at a focal plane, or can be a determination based on such a signal, such as a representation of a position and/or attitude, e.g., a quaternion.

For producing the output, the star tracker 100 can include an optical system 114 that can include magnification optics 118 and a sensor 124. The optical system 114 can be, for example, a telescope. For rejecting out-of-field light, the star tracker 100 can further include an out-of-field rejection filter (OFRF) 104 that can include an optical component 110 capable of converting randomly polarized light to p-polarized light, and a filter 112 capable of selecting for angle of incidence of p-polarized light. Component 110 can be, for example, a high efficiency random to p-polarizer converter. Filter 112 can be, for example, a multi-layer angular selectivity filter that makes use of Brewster's angle transmission. Together, these elements 110, 112 can reject out-of-field light.

Figure 2:
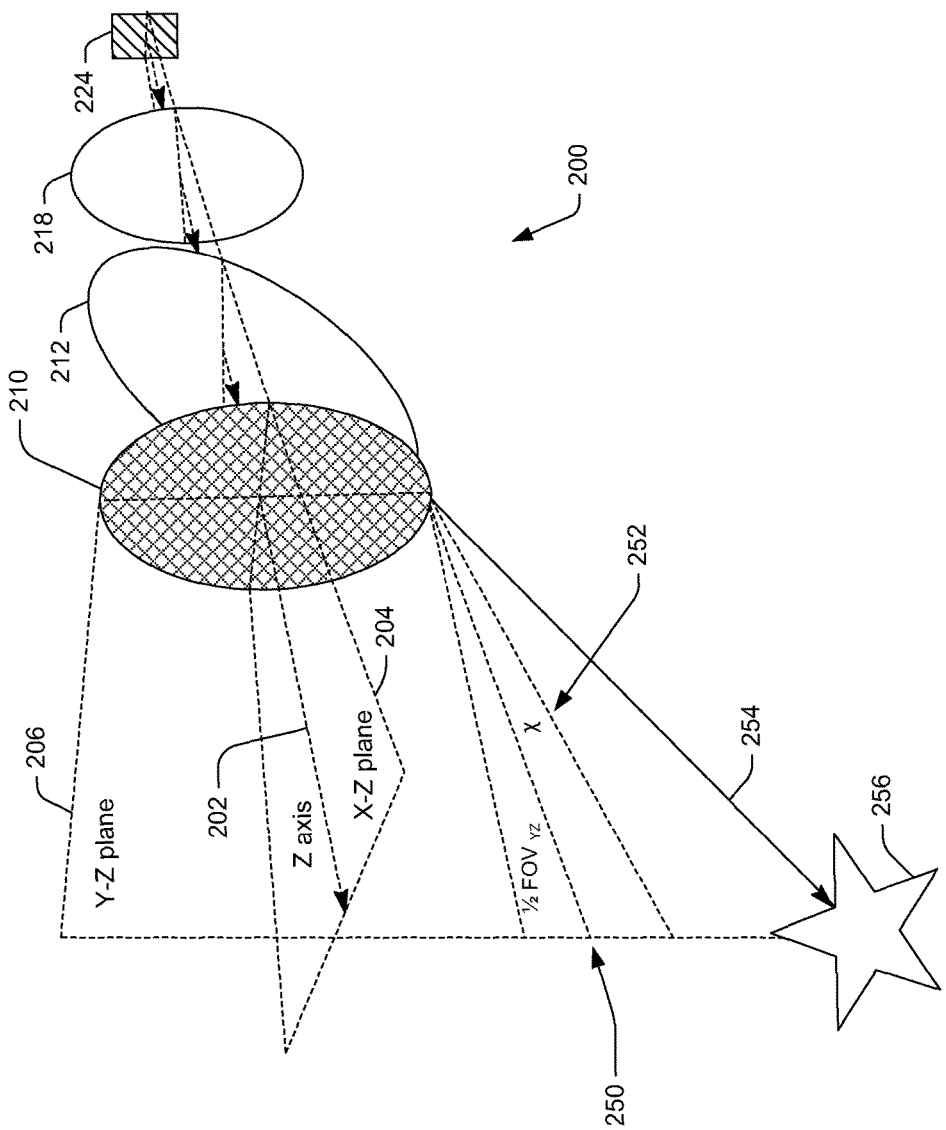
FIG. 2 is a light vector diagram of star tracker out-of-field rejection.

FIG. 2 is a light vector diagram showing how out-of-field light from bright source 256 is rejected by star tracker elements 200. Star tracker elements 200 are aligned along an optical axis 202, also called a Z-axis or boresight, passing through an X-Z plane 204 and a Y-Z plane 206, and include random-to-p-polarization converter 210 (corresponding to element 110 of FIG. 1) and p-pass and s-rejection filter 212, i.e., an angular selectivity layer (corresponding to element 112 of FIG. 1), which together form an out-of-field rejection filter (OFRF) (corresponding to element 104 of FIG. 1). Elements 200 further include the magnification optics 218 of the star tracker's optical system (corresponding to element 118 of FIG. 1), and a sensor 224, which can be placed at the focal plane. Light from bright source 256 in Y-Z plane 206 outside of exclusion angle x 252 (i.e., Greek letter chi) is largely rejected by angular rejection filter 212. For exclusion angles specified relative to a ray at the extrema of the FOV, this angle can be, for example, on the order of 5°. The OFRF 210, 212 can, for example, restrict light to within ±4° of the boresight. In such an arrangement, the transmitted light quickly drops to zero beyond, for example, 4.5° past the half FOV 250. The off-axis rejection can thus be extremely large when the bright source 256 is 10° off the optical axis 202.

Figure 3:
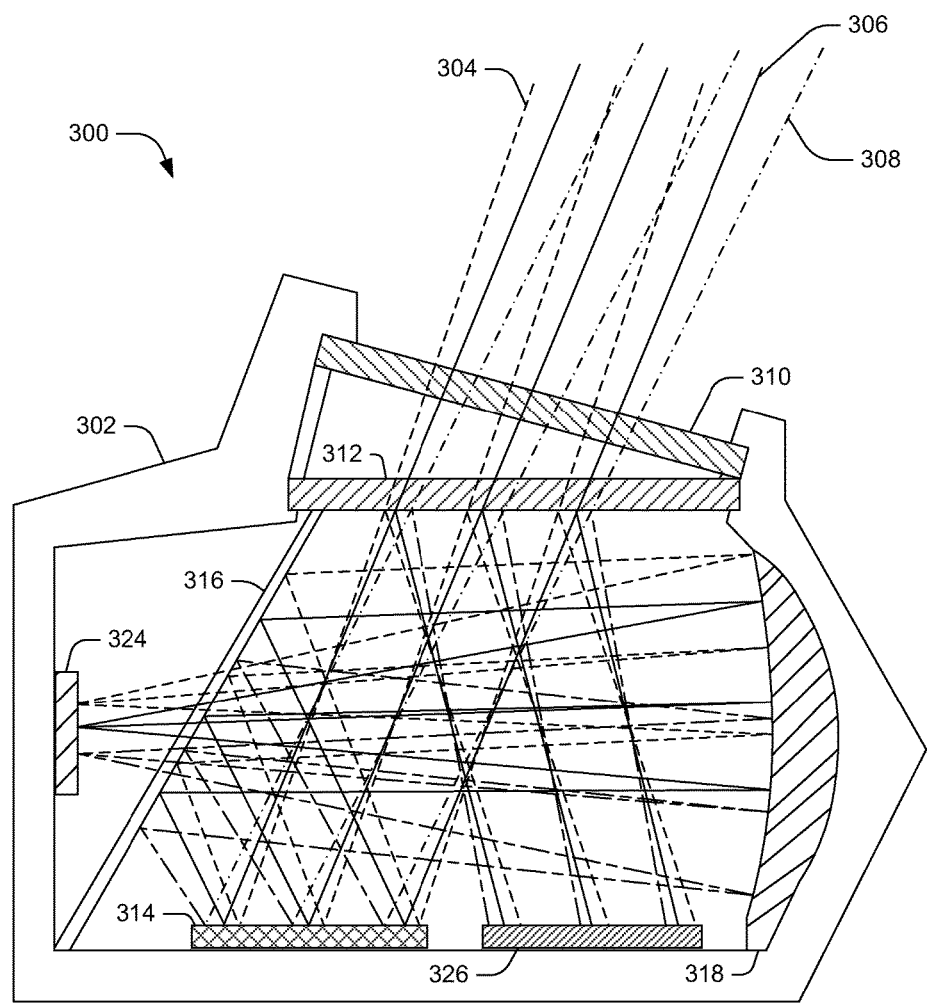
FIG. 3 is a cross-sectional diagram of an example star tracker.

FIG. 3 is a cross-sectional diagram of an example star tracker 300 having an optical system arranged as a folded Schmidt telescope having a focal ratio of f/4. The star tracker 300 illustrated can have field angles of, for example, ±4° about the boresight angle. As an example, with an array size of 2,048×2,048 4.45-micrometer pixels, an entrance pupil diameter $D_0$ of 3.33 centimeters and a focal length f of 13.34 centimeters supports a FOV of 8° over an FPA size d of 0.93 centimeters.

In FIG. 3, far-angle light 304, mid-angle light 306, and near-angle light 308 enters from the top. The star tracker 300 is encompassed by housing 302, which serves to hold together and protect the various optical parts. An out-of-field rejection filter (OFRF) to reject bright stray light includes random-to-p-polarization converter 310 and angular selectivity layer 312, as discussed with respect to similarly numbered elements in FIGS. 1 and 2.

Following out-of-field rejection, incoming light is reflected off of adaptive optical element (AOE) or fixed spherical aberration corrector 314, flat deviating mirror 316, spherical primary mirror 318, and is resolved on focal-plane array (FPA) 324. Given the f/4 focal ratio N of star tracker 300, a Q value of 0.44 can be achieved when FPA 324 has a pixel pitch p of 4.45 micrometers.

Calibrator 326 (e.g., with s-polarization filter) can be placed to generate calibration light which is then reflected off the underside of the angular selectivity layer 312 into the optical path. The calibrator can be a flood source or can have a more elaborate optical system to create a point source in the focal plane. As examples, calibrator 326 can consist of an array of light-emitting diodes (LEDs), or a lamp. In any case, the calibrator ensures that the radiometric response of the focal plane is known. Simple diamond-turned optics can be used for primary mirror 218 and deviating mirror 316. The illustrated star tracker 300 can perform well with a bright source outside 15° of the optical axis.

Figure 4A:
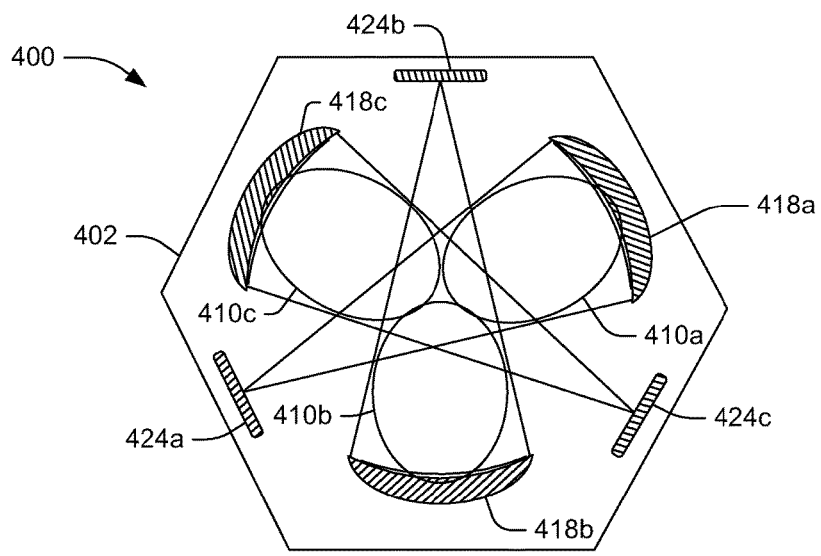
FIGS. 4A and 4B are overhead cross-sections of a three-star tracker package arrangement.
Figure 4B:
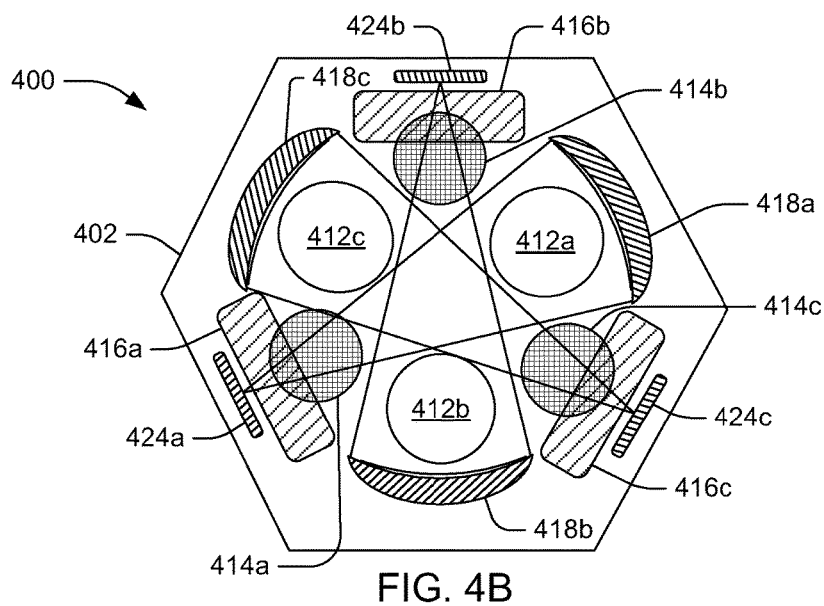

The ability to eliminate or substantially reduce the size of sun shades permits multiple star trackers to be packaged together in a compact form for greater FOV. FIGS. 4A and 4B are overhead cross-sections of a package arrangement 400 of three star trackers of the type shown in FIG. 3 to create, effectively, a three-axis star tracker 400. Although the sections of FIGS. 4A and 4B show the same view, the sections are separated into two illustrations for clarity. FIG. 4A shows a section at an upper level while FIG. 4B shows a section at a lower level beneath the upper level section of FIG. 4A. Both sections show package housing 402 having a base, primary mirrors 418a, 418b, 418c, and FPAs 424a, 424b, 424c. FIG. 4A shows OFRF random-to-p-polarization converters 410a, 410b, 410c. FIG. 4B shows OFRF angular selectivity layers 412a, 412b, 412c, as well as AOEs or fixed spherical aberration correctors 414a, 414b, 414c, and deviating mirrors 416a, 416b, 416c.

The boresights of the three star trackers can be arranged such that the star trackers have substantially non-overlapping fields of view. By "substantially non-overlapping," it is meant that one star tracker in the package 400 shares no more than 33% of the FOV of any other star tracker in the package 400. As additional examples, package 400 can be arranged such that no star tracker in the package 400 shares no more than 20% of the FOV of any other star tracker in the package 400, or such that no star tracker in the package 400 shares no more than 10% of the FOV of any other star tracker in the package 400. In the package arrangement 400 illustrated, the azimuth difference is 120° between trackers with elevations ranging from ±4.5° about a 55° angle relative to the base. Because the light transmission paths can share space, the package 400 can take up less volume than would be taken by three star trackers packaged individually.

Figure 5:
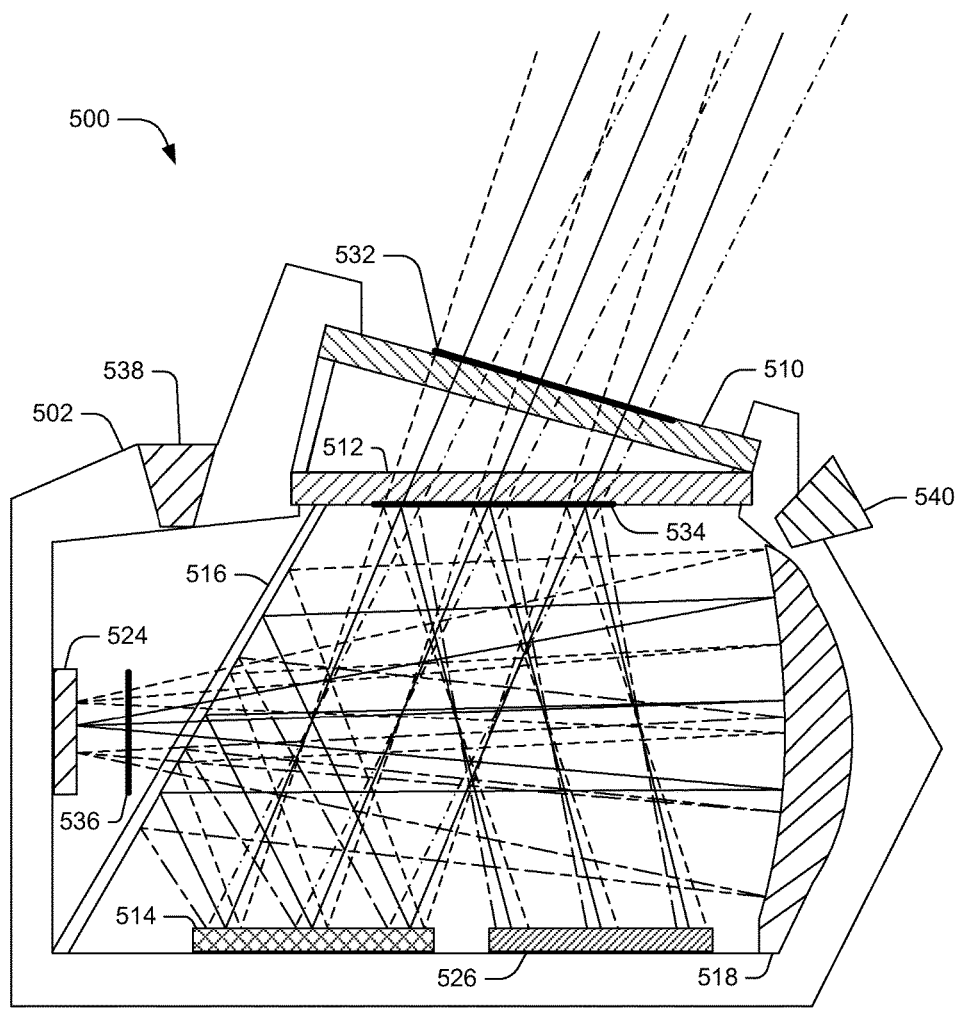
FIG. 5 is a cross-sectional diagram of an example star tracker.

FIG. 5 is a cross-sectional diagram of an example star tracker 500, similar to the star tracker 300 of FIG. 3, but additionally including sun shutters 532, 534, 536 and sun-sensor photodiodes 538, 540 for enhanced FPA protection. As with the previously described design, housing 502 holds together the various parts, including AOE or fixed spherical aberration corrector 514, deviating mirror 516, primary mirror 518, and calibrator 526. A first sun shutter 532 can be mounted to random-to-p-polarization converter 510. A second sun shutter 534 can be mounted to angular selectivity layer 512. A third sun shutter 536 can be mounted in front of FPA 524. Each sun shutter 532, 534, 536 can be of the mechanical variety, such as a two-position linear filter change device, a mechanical iris, or a guillotine cover that obscures the clear aperture when engaged. After p-polarization, e.g., at position 534, an s-polarized filter can effectively block light into the star tracker 500. Other sun shutter types may include liquid crystal and electro-chromic devices with electronically controlled transparency. Mechanical shutters have an advantage in that they do not add attenuation to the optical device.

Sun-sensor photodiodes 538, 540 can be used to trigger shutters 532, 534, 536 to protect FPA 524 when the sun is within the FOV of the star tracker 300. Alternatively or additionally to the use of photodiodes, the shutters can be triggered based on a light intensities sensed at the FPA 524. Additionally or alternatively to the shutters, AOE 514 can be configured to defocus direct sunlight, thereby prevented focused sunlight from striking FPA 524 and protecting FPA 524 from damage. Certain focal plane technologies are not as susceptible to damage by the sun or other bright sources, and hence could operate without the complexity of a sun shutter.

Figure 6:
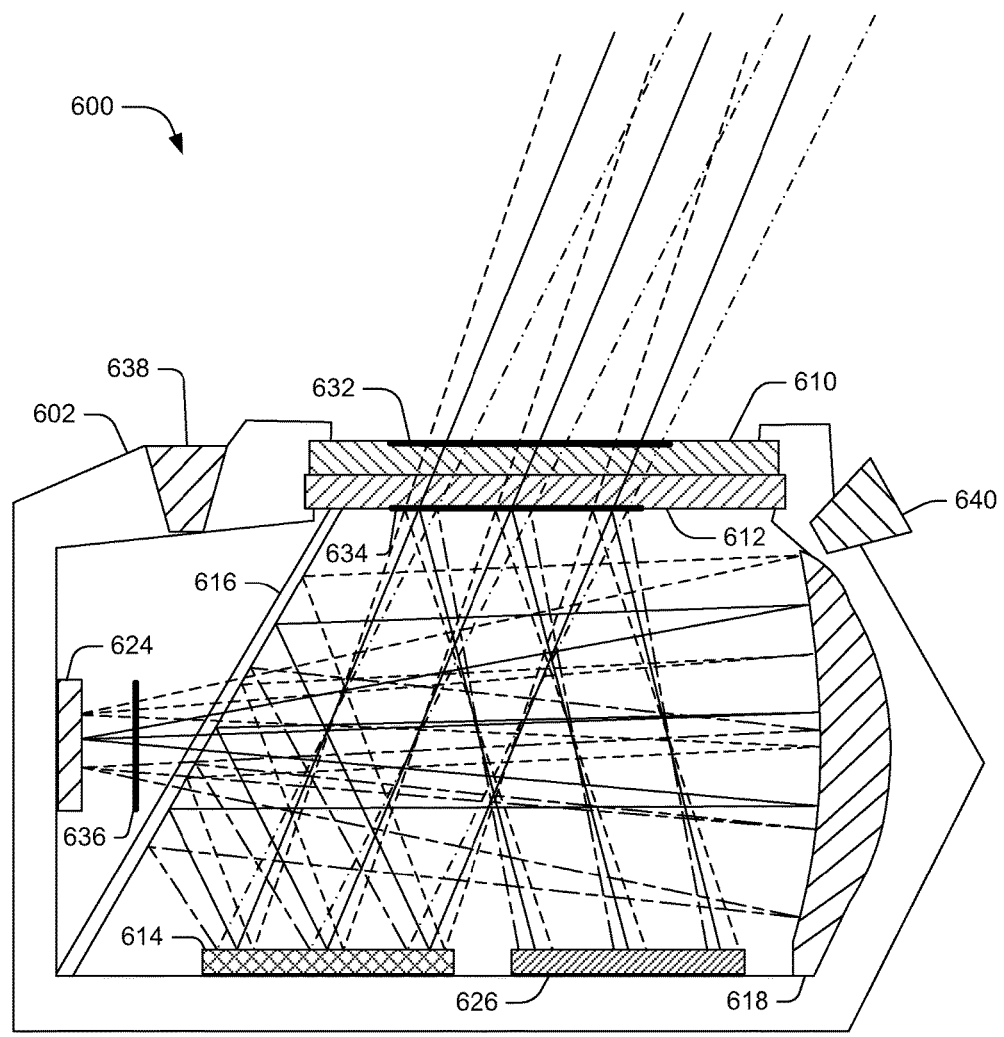
FIG. 6 is a cross-sectional diagram of an example star tracker.

In the examples illustrated in FIGS. 3 and 5, there is some amount of angular separation (e.g., 55°) between the OFRF elements (310/312 in FIGS. 3 and 510/512 in FIG. 5). FIG. 6 is a cross-sectional diagram of an example star tracker 600, similar to the star trackers 300 and 500 of FIGS. 3 and 5, but with the OFRF elements, i.e., random-to-p-polarization converter 610 and angular selectivity layer 612, mounted flush with each other, further reducing the overall volume of the star tracker. As in the previously described examples, star tracker 600 can include housing 602, AOE or fixed spherical aberration corrector 614, deviating mirror 616, primary mirror 618, FPA 624, calibrator 626, sun shutters 632, 632, 636, and/or sun-sensor photodiodes 638, 640.

Figure 7:
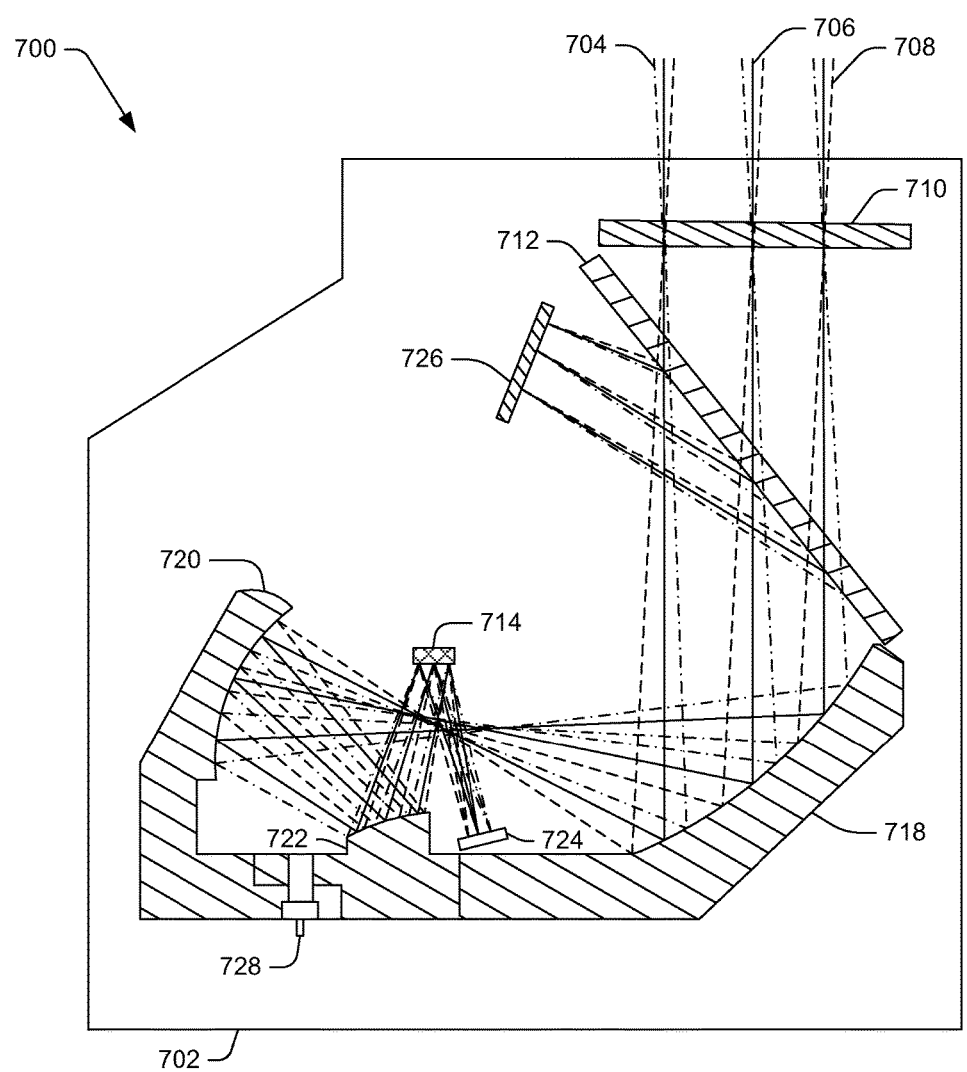
FIG. 7 is a cross-sectional diagram of an example star tracker.

FIG. 7 is a cross-sectional diagram of another example star tracker 700, in which the optical components are arranged as a three-mirror telescope, e.g., in the fashion of a Korsch f/6 telescope. Given a star tracker design function of Q=0.44 and a design wavelength of 0.5 micrometers, the detector element size p for the FPA 724 of star tracker 700 can be, for example, 6.82 micrometers. As an example, choosing FPA 724 to comprise a 2,048×2,048 pixel array and restricting the FOV to 8° over a 1.4-centimeter physical size d of FPA 724, star tracker 700 can have a focal length f of 10 centimeters and an aperture of 1.67 centimeters. Polarization converter 710 must be at least as large as the aperture $D_0$. The length of the angular selectivity filter 712 can be about 2.72 centimeters in the configuration shown in FIG. 7 with the aforementioned focal plane sizing choice. For the dimensions described, the AOE 714 can be about 1.5 centimeters in size. The design of star tracker 700 thus allows significant room to support AOE ancillary equipment required for control of AOE 714. AOE 714 allows performance beyond the nominal 6° FOV supported by this optical design.

Housing 702 acts as an optical bench holding together the various components. Far angle light 704, mid-angle light 706, and near-angle light 708 enter from above and pass through OFRF random-to-p-polarization converter 710 and OFRF angular selectivity layer 712. Together, these OFRF elements mitigate stray light and eliminate or greatly reduce the need for a bulky sun shade while still providing a large operational window for star tracker 700. Light can reflect off primary mirror 718, secondary mirror 720, tertiary mirror 722, and AOE or fixed spherical aberration corrector 714 before resolving on FPA 724. Calibrator 726 can be placed as shown to receive light reflected from the underside of angular selectivity layer 712. One or more pins 728 can fasten mirrors 718, 720, 722 to housing 702. Additional structure (not shown) can emanate from the structure of mirror 720 to support AOE or fixed spherical aberration corrector 714 and FPA 724 such that the optical elements come together appropriately when pinned by pin(s) 728. Although not shown for the sake of simplicity, the star tracker 700 of FIG. 7 could be outfitted with sun shutters and sun-sensor photodiodes to further protect FPA 724 from direct sunlight, as described above and as illustrated in FIGS. 5 and 6.

Figure 8:
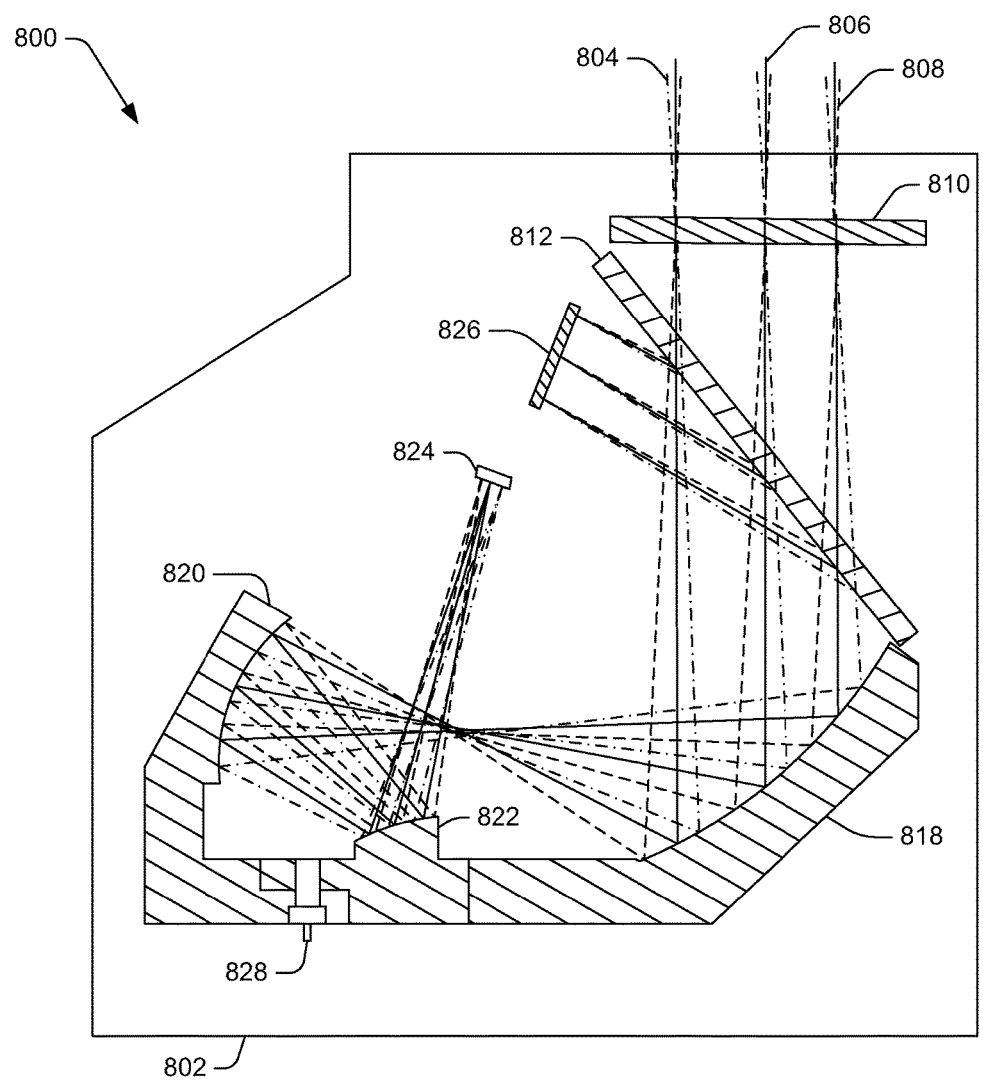
FIG. 8 is a cross-sectional diagram of an example star tracker.

FIG. 8 is a cross-sectional diagram of a star tracker 800 with an optical arrangement similar to that of star tracker 700 shown in FIG. 7, but with FPA 824 arranged to receive light directly from tertiary mirror 822 (i.e., without an AOE or fixed spherical aberration corrector). Without an AOE to adjust the image at larger field angles, star tracker 800 supports a smaller FOV of, for example, 6° relative to star tracker 700. As an example, choosing FPA 824 to have a 2,048×2,048 pixel array with 6.82-micrometer pixel pitch p and restricting the FOV to 6° over a 1.4-centimeter physical size d FPA 824 results in a star tracker with a focal length f of 13.32 centimeters, and aperture $D_0$ of 2.22 centimeters. The polarization converter 810 must be at least as large as the aperture $D_0$. The length of the angular selectivity filter 812 (i.e., the distance in the vertical dimension of FIG. 8) is about 2.71 centimeters in the configuration shown in FIG. 8 with this focal plane sizing choice. More generally, the required length L of the angular selectivity filter 812 is L=D sin(π/2−β), where D is the diameter of the angular selectivity filter 812 and β is the effective Brewster's angle of the angular selectivity filter 812.

Far angle light 804, mid-angle light 806, and near-angle light 808 enter from the top. Housing 802 holds together OFRF random-to-p-polarization converter 810, OFRF angular selectivity layer 812, primary mirror 818, secondary mirror 820, tertiary mirror 822, FPA 824, and calibrator 826. Pins 828 can fasten mirrors 818, 820, 822 to housing 802. Additional structure (not shown) can emanate from the structure of mirror 820 to support FPA 824 such that the optical elements come together appropriately when pinned by pin(s) 828. Again, sun shutters and sun-sensor photodiodes have been omitted from illustration in this example, but could be included.

Figure 9:
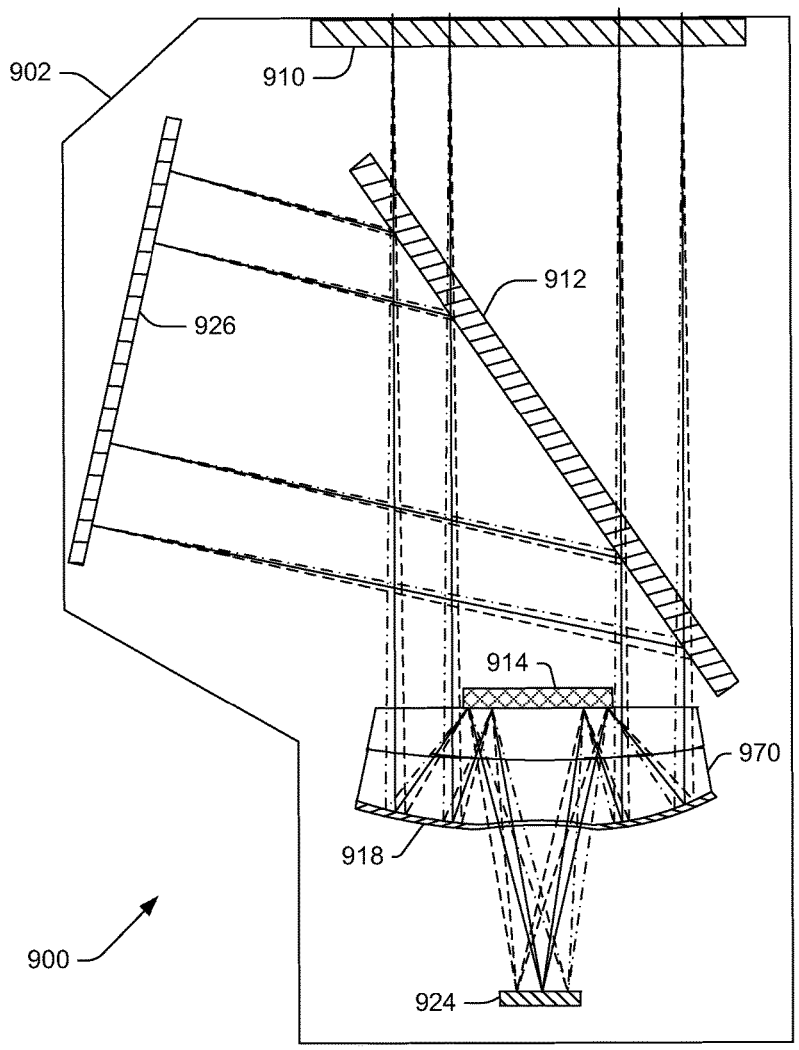
FIG. 9 is a cross-sectional diagram of an example star tracker.

FIG. 9 is a cross-sectional diagram of another example star tracker 900, in which the optical components are arranged to have a form of solid catadioptric arrangement. The design of star tracker 900 allows a compact optical design when the index of the two refractive elements and mirror curvature are chosen to minimize physical length relative to aperture. The illustrated arrangement can have, for example, a focal ratio N of f/2.18. A solid catadioptric optical bench support structure is not indicated on this diagram, but could be similar to that depicted in FIG. 10.

As an example, given a star tracker design function of 0.44 and a design wavelength of 0.5 micrometers, detector element size p for star tracker 902 can be chosen to be 2.48 micrometers. Choosing a 2,048×2,048 array and restricting the FOV to 8° over a 0.51-centimeter physical size d FPA 924 results in a star tracker with a focal length f of 3.63 centimeters, and an aperture $D_0$ of 1.672 centimeters. Star tracker 900 can also be scaled by selecting either a larger or smaller physical focal plane, while maintaining a 2.48-micrometer pixel pitch p to meet the star tracker design goals outlined previously. Larger pixel count FPAs will have smaller instantaneous field-of-view (IFOV) values, longer focal lengths, and larger aperture sizes.

Housing 902, which, as with other examples described herein, can be a snap-together housing, holds together components including OFRF random-to-p-polarization converter 910, OFRF angular selectivity layer 912, and a single refractive element 970 that is annularly coated to form a primary mirror 918. AOE or fixed spherical aberration corrector 914 can be mounted to refractive element 970 and act as a secondary mirror to focus light on FPA 924.

Calibrator 926 can be placed as shown to receive light reflected from the underside of angular selectivity layer 912. Although not shown for the sake of simplicity, star tracker 900 could be outfitted with sun shutters and sun-sensor photodiodes to further protect FPA 924 from direct sunlight as described above and as illustrated in FIGS. 5 and 6.

Figure 10:
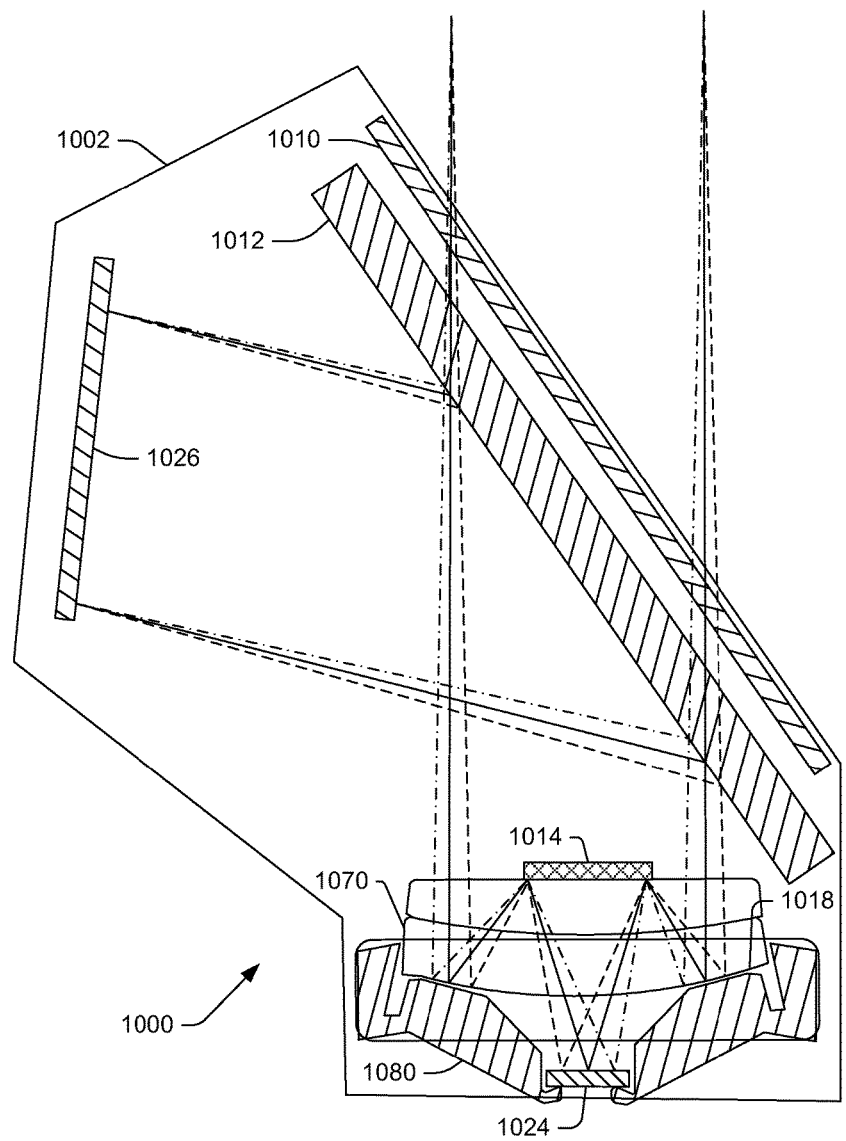
FIG. 10 is a cross-sectional diagram of an example star tracker.

FIG. 10 is a cross-sectional diagram of another example star tracker 1000, similar to star tracker 900 shown in FIG. 9, but with polarization converter 1010 designed to operate efficiently at the same orientation angle as angular selectivity filter 1012, such that the OFRF elements, i.e., random-to-p-polarization converter 1010 and angular selectivity layer 1012, can be mounted essentially flush with each other, further reducing the overall volume of the star tracker. As in the previously described example, star tracker 1000 can include housing 1002, refractive element 1070 annularly coated to form primary mirror 1018, AOE or fixed spherical aberration corrector 1014, FPA 1024, calibrator 1026, sun shutters (not shown), and/or sun-sensor photodiodes (not shown). Refractive element 1070 can be held in place by solid catadioptric optical bench support structure 1080, while AOE 1014 can be mounted to refractive element 1070. The design of star tracker 1000 is a slightly faster design than that of star tracker 900, and supports smaller pixels of, for example, 1.95 micrometers.

Star tracker 1000 can have a focal ratio N of, for example, f/1.7. As an example, given a star tracker design function of 0.44 and a design wavelength of 0.5 micrometers, detector element size p for star tracker 1000 can be chosen to be 1.95 micrometers. Choosing a 2,048×2,048 array and restricting the FOV to 8° over a 0.4-centimeter physical size d FPA 1024 results in a star tracker with a focal length f of 2.86 centimeters, and an aperture $D_0$ of 1.66 centimeters. Star tracker 1000 can also be scaled by selecting either a larger or smaller physical focal plane, while maintaining the 1.95-micrometer pixel pitch p to meet the star tracker design goals outlined previously. Larger pixel count FPAs will have smaller IFOV values, longer focal lengths, and larger aperture sizes.

Figure 11:
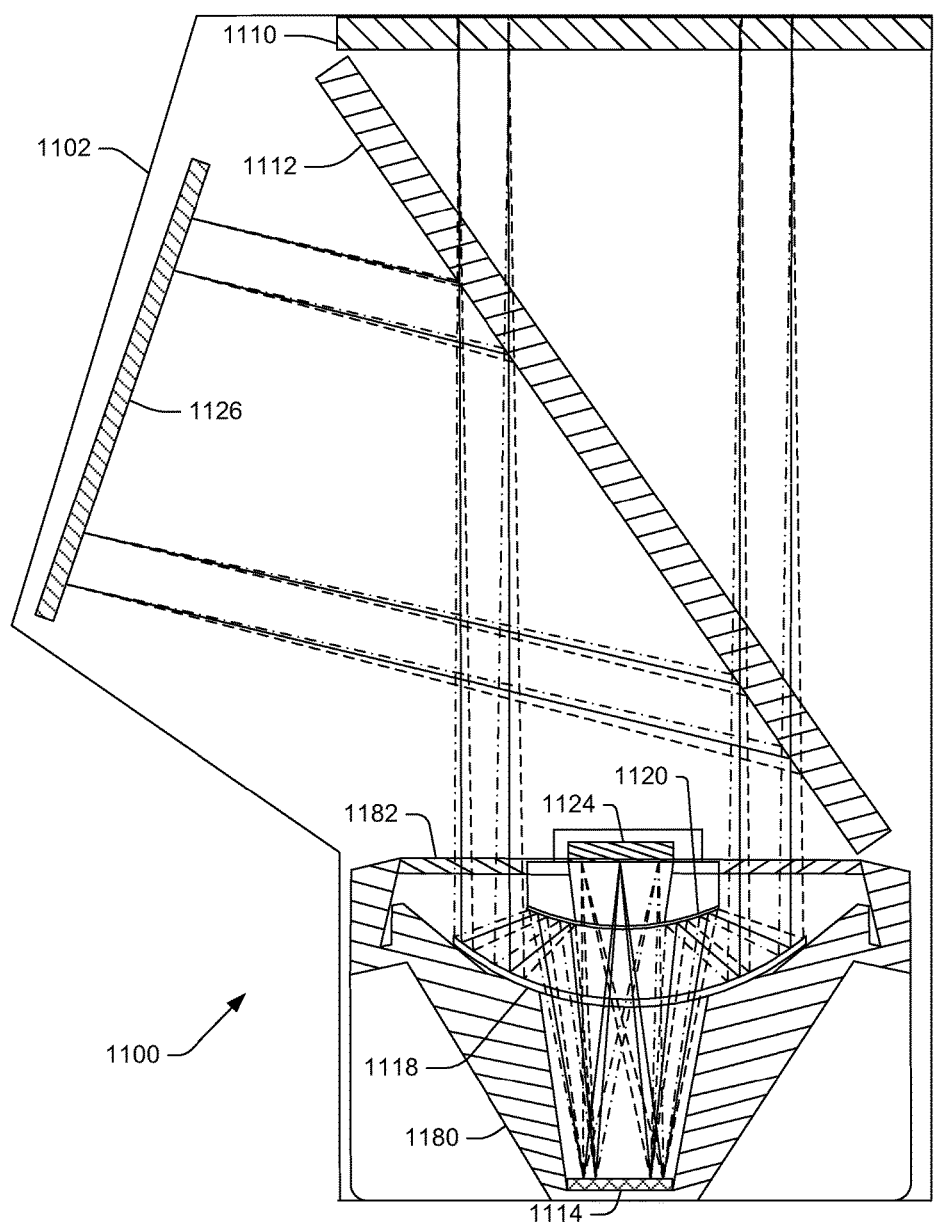
FIG. 11 is a cross-sectional diagram of an example star tracker.

FIG. 11 is a cross-sectional diagram of another example star tracker 1100, in which the optical components are arranged in a Cassegrain reflector configuration, i.e., having a combination of a primary concave mirror 1118 and a secondary convex mirror 1120. The illustrated arrangement can have, for example, a focal ratio N of about f/4.42 and therefore an optimal pixel size p of about 5 micrometers. Cassegrain telescopes are very narrow field, and even with an AOE to extend the performance of the FOV, the design of star tracker 1100 is likely to support only a 1° FOV. With a 720×640 pixel-count FPA, for example, the focal length f of star tracker 1100 can be 20.7 centimeters and star tracker 1100 can have an aperture of 4.68 centimeters.

Housing 1102 holds together components including OFRF random-to-p-polarization converter 1110, OFRF angular selectivity layer 1112, and calibrator 1126, which can be placed as shown to receive light reflected from the underside of angular selectivity layer 1112. Housing 1102 can also hold solid catadioptric optical bench support structure 1180, which in turn can hold FPA 1124, primary mirror 1118, and spider 1182 to support secondary mirror 1120 and AOE or fixed spherical aberration corrector 1114. Although not shown for the sake of simplicity, the star tracker 1100 of FIG. 11 could be outfitted with sun shutters and sun-sensor photodiodes to further protect FPA 1124 from direct sunlight as described above and as illustrated in FIGS. 5 and 6.

Figure 12:
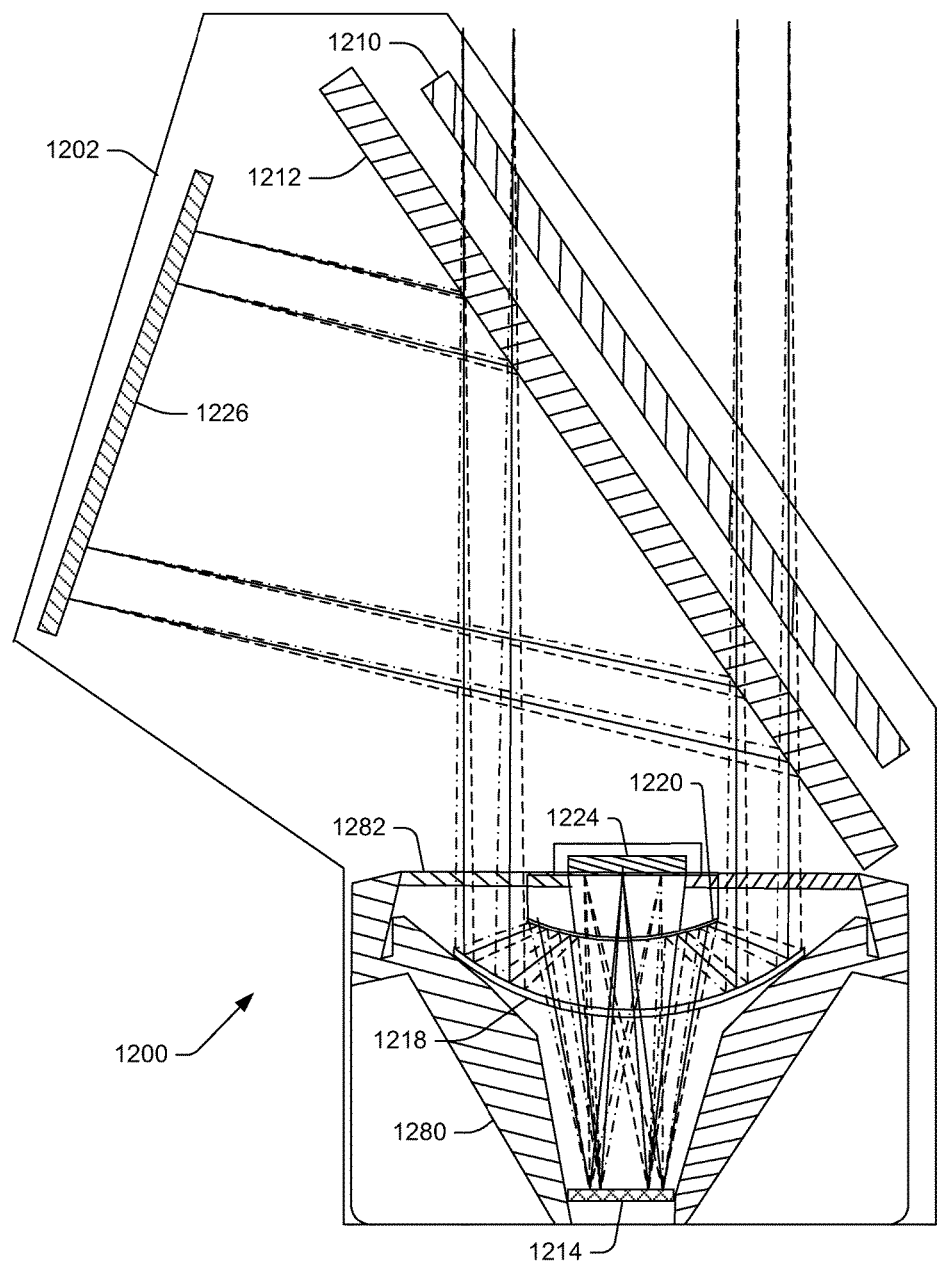
FIG. 12 is a cross-sectional diagram of an example star tracker.

FIG. 12 is a cross-sectional diagram of another example star tracker 1200, similar to star tracker 1100 shown in FIG. 11, but with the polarization converter 1210 designed to operate at the optimal tilt angle for angular selectivity filter 1212, such that OFRF elements, i.e., random-to-p-polarization converter 1210 and angular selectivity layer 1212, can be mounted essentially flush with each other, further reducing the overall volume of the star tracker. As in the previously described example, star tracker 1200 can include housing 1202, primary mirror 1218, secondary mirror 1220, AOE or fixed spherical aberration corrector 1214, FPA 1224, calibrator 1226, solid catadioptric optical bench support structure 1280, spider 1282, sun shutters (not shown), and/or sun-sensor photodiodes (not shown).

Figure 13A:
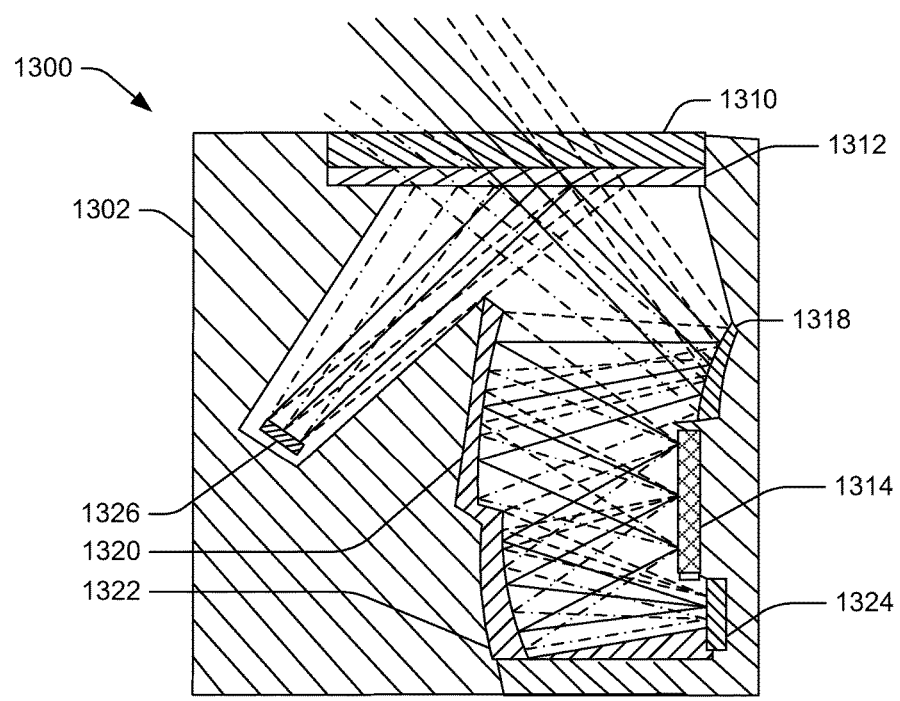
FIGS. 13A and 13B are cross-sectional diagrams of an example star tracker.
Figure 13B:
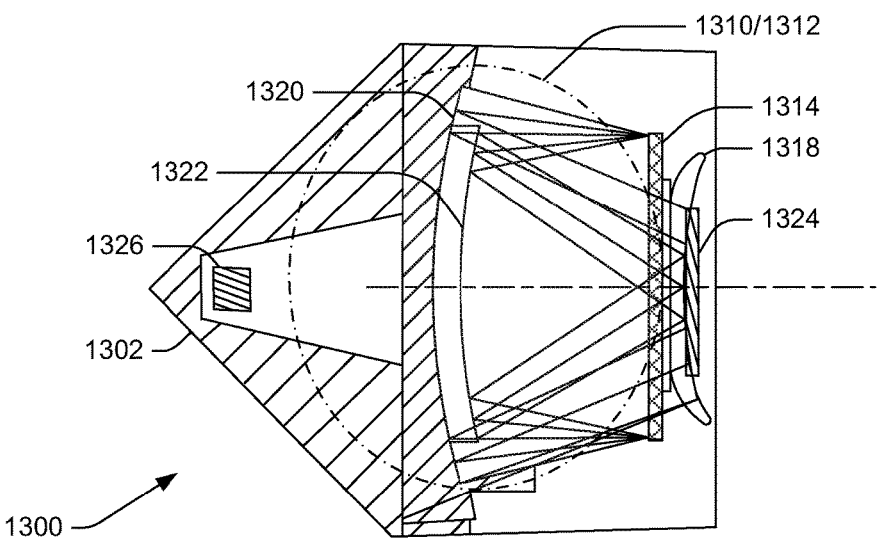

FIGS. 13A and 13B are cross-sectional diagrams showing different views of another example star tracker 1300, which is a three-mirror flat and wide field telescope. FIG. 13A shows a side view while FIG. 13B shows a view from above. The illustrated arrangement can have, for example, a focal ratio N of about f/1 and therefore an optimal pixel size p for a star-tracking mission of a little over 1 micrometer. Housing 1302 holds together components including OFRF random-to-p-polarization converter 1310, OFRF angular selectivity layer 1312, primary mirror 1318, secondary mirror 1320, AOE or fixed spherical aberration corrector 1314 (acting as a fold mirror), tertiary mirror 1322, and FPA 1324. To fully exploit the FOV of star tracker 1300, the angular selectivity filter 1312 and random-to-p-polarizer 1310 can be designed to operate over a wider field of view, e.g., ±6°.

Calibrator 1326 can be placed as shown to receive light reflected from the underside of angular selectivity layer 1312. Additionally or alternatively, a calibration source can be placed at the position indicated by reference numeral 1314. Although not shown for the sake of simplicity, the star tracker 1300 of FIGS. 13A and 13B can be outfitted with sun shutters and sun-sensor photodiodes to further protect FPA 1324 from direct sunlight as described above and as illustrated in FIGS. 5 and 6.

Figure 14A:
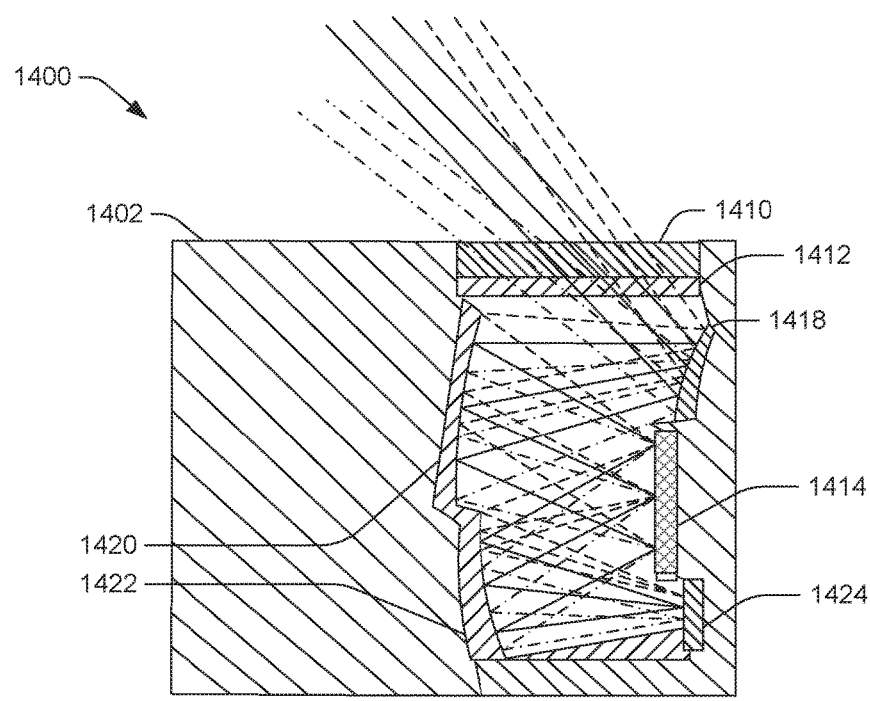
FIGS. 14A and 14B are cross-sectional diagrams of an example star tracker.
Figure 14B:
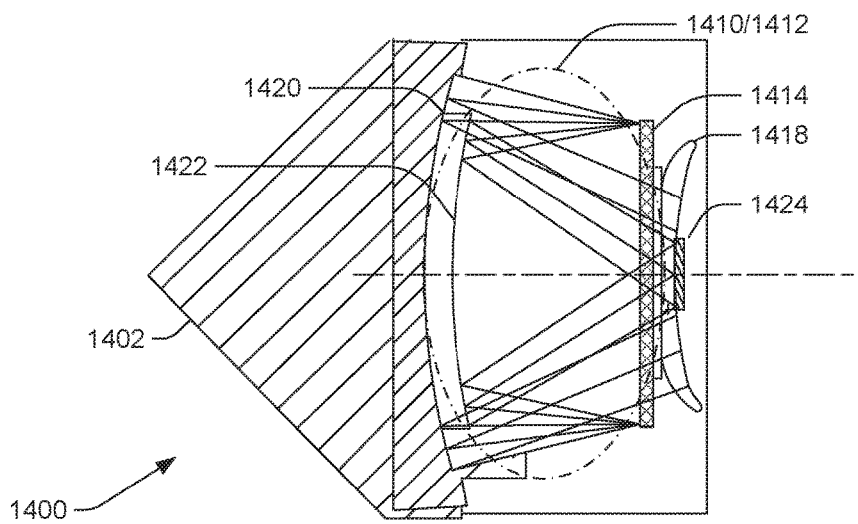

FIGS. 14A and 14B are cross-sectional diagrams showing different views of another example star tracker 1400, similar to the star tracker 1300 shown in FIGS. 13A and 13B, except with the calibrator eliminated to provide an even more compact star tracker. As in the previous example, housing 1402 holds together components including OFRF random-to-p-polarization converter 1410, OFRF angular selectivity layer 1412, primary mirror 1418, secondary mirror 1420, AOE or fixed spherical aberration corrector 1414 (acting as a fold mirror), tertiary mirror 1422, and FPA 1424. Although not shown for the sake of simplicity, the star tracker 1400 of FIGS. 14A and 14B could be outfitted with sun shutters and sun-sensor photodiodes to further protect FPA 1424 from direct sunlight as described above and as illustrated in FIGS. 5 and 6. The surplus volume of housing 1402 on the left side of each diagram can be eliminated, or can be retained to permit individual star trackers 1400 to be easily tacked, as shown in FIG. 15A.

FIG. 15A is a top view section of a package arrangement 1500 of four star trackers to create, effectively, a four-axis star tracker 1500. The package arrangement 1500 is illustrated using trackers like those shown in FIGS. 13A, 13B, 14A, 14B, but could be used for any of the trackers disclosed herein. Accordingly, certain details in the placement of the optics have been omitted. All of the trackers can be manufactured to be packaged in a single housing or multiple housings 1502a, 1502b, 1502c, 1502d can be tacked together. The housing or housings contain or respectively contain OFRF random-to-p-polarization converters 1510a, 1510b, 1510c, 1510d, OFRF angular selectivity layers 1512a, 1512b, 1512c, 1512d, AOEs or fixed spherical aberration correctors 1514*a*, 1514*b*, 1514*c*, 1514*d*, FPAs 1524*a*, 1524*b*, 1524*c*, 1524*d*, mirrors 1518*a*, 1518*b*, 1518*c*, 1518*d*, calibrators (not shown), shutters (not shown), and sun sensor photodiodes (not shown). When four individual housings are tacked, pins can be placed at pin positions (e.g., 1590) on lines of symmetry between the four star trackers. The bottom view (shown in phantom) has the mirror-image configuration of the top view (not shown in FIG. 15A), such that a staircase configuration at the interface between housings can be used to pin the housings together, as shown in FIG. 15B. FIG. 15B shows a side-view cross section of the interface with a pin 1590*a* connecting housings 1502*a* and 1502*b*. The illustrated example using pins at a staircase configuration interface is but one manner of tacking multiple housings, but multiple housings can be tacked in other configurations as well, or using adhesive, for example.

In the package arrangement 1500 illustrated in FIG. 15A, the azimuth difference is 90° between trackers with elevations ranging from ±4.5° about the boresight angle, depending upon the optical arrangement used. In the arrangements 1300 and 1400 shown in FIGS. 13A, 13B, 14A, 14B, for example, the boresight is at a 55° angle relative to the base, whereas with the arrangements 700, 800, 900, 1000, 1100, and 1200 shown in FIGS. 7-12, the boresight is 0° relative to the base, in which case the individual trackers must be canted by the optical bench mount to provide the appropriate separation of FOV of the individual trackers in the package 1500.

Any of the various star tracker designs described above may be selected to meet the mission requirements of the star tracker. The various star tracker designs described above may also be modified to have varying focal ratios and other design parameters. Some surfaces that appear flat as illustrated might also be curved (e.g., aspheric).

Figure 16:
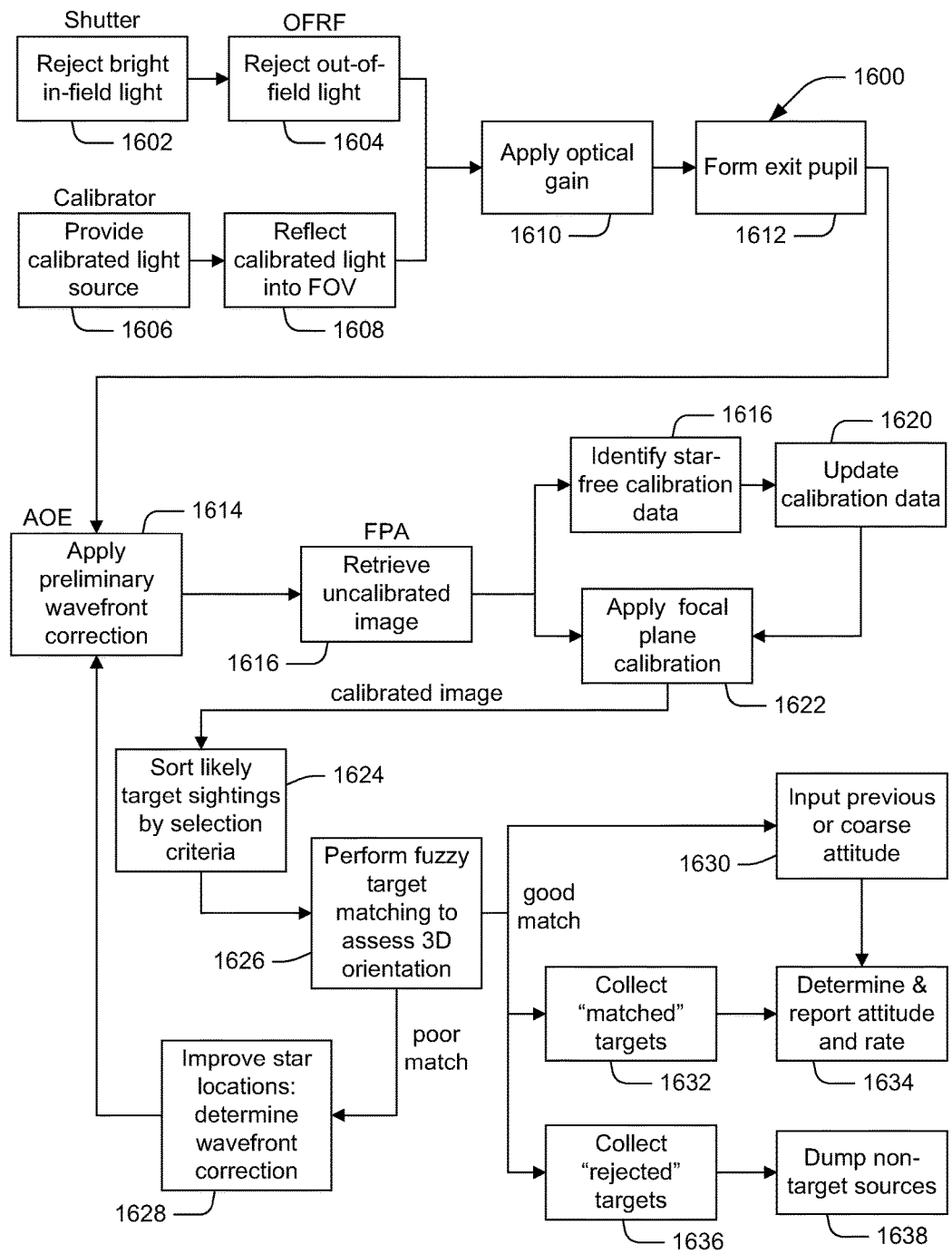
FIG. 16 is a flow chart of an example method of star tracking.

FIG. 16 is a flow chart depicting a method 1600 of star tracking to determine attitudes and/or rates based on star imagery collected from a star tracker having features described above. Starfield light can be admitted to the star tracker, and when a bright source, such as the Sun, is in the star tracker's field of view, a shutter can reject 1602 bright in-field light. In order to lessen stray light from a bright source not directly in the field of view, an out-of-field rejection filter can reject 1604 out-of-field light. Simultaneously or periodically, a calibrator can provide 1606 a calibrated light source to perform a relative calibration, the light from which can be reflected 1608 into the field of view, e.g., by reflecting off the underside of the out-of-field rejection filter. The rejection filter can reflect s-polarized light into the field of view of the tracker. This calibration light can be used to perform 1622 focal plane radiometric calibration. The star tracker may also view stars for with known flux, which can be used for absolute calibration. Dark noise calibration 1616 can be achieved either by closing a shutter (if so equipped) or by taking focal plane samples while the tracker is viewing an area of space with stars below the minimum detectable magnitude of the tracker, with bright sources well outside the exclusion angle of the OFRF.

The star tracker optics can apply 1610 optical gain to the incident star light and an exit pupil can be formed 1612. When an adaptive optical element is present near the exit pupil, it can be used to apply 1614 preliminary wavefront correction to improve the image to the diffraction limit. Stars near the edge of the field may suffer from geometric aberrations that can be corrected by manipulating the surface of the AOE based on Zerneke polynomials and the assumption that stars should look like point sources on the focal plane array.

A focal plane array can retrieve 1616 an un-calibrated image. A microprocessor or other processing circuitry can identify 1616 star-free calibration data and update 1620 calibration data based on the identified data. The processor or circuitry can then perform 1622 focal plane calibration on the un-calibrated image to derive a calibrated image containing a number of targets (e.g., stars), which can be analyzed to sort 1624 likely target sightings by selection criteria. The processor or circuitry can further perform 1626 fuzzy target matching to assess the 3D orientation of the star tracker, and, accordingly, that of the satellite or craft to which the star tracker is fixedly mounted.

If the match is a good match, collected matched targets 1632 and an input previous or coarse attitude 1630 can be used to determine 1634 (and report) a new attitude and rate, which can be output to telemetry or to further processing. Rejected targets can also be collected 1636 and non-target sources can be dumped 1638 to additional processing. This successfully ends the method, which can restart. However, if the match is poor, star locations can be improved 1628 on the assumption that blurry objects at locations expected via the coarse attitude knowledge are stars with large amounts of third-order aberration. A series of AOE mirror deformations based, for example, on Zernike polynomials can be applied in star tracker designs with AOEs to reduce geometrical aberrations below the diffraction limit. The preliminary wave front correction 1614 can be based on a third-order aberration model for the position of the star in the FOV. Certain aberrations can be expected to grow quadratically, for example, with positions relative to the optical center of the star tracker array. The point response function can be monitored as various AOE configurations are attempted, until a match is close enough to the expectation for the diffraction-limited point response function. These configurations can be determined during integration and test, and stored for later use, e.g., while the star tracker is in orbit. Additional corrections near the expected preliminary correction can be attempted to remove the effects of thermal distortions that might corrupt the reported star positions used for attitude determination.

Figure 17:
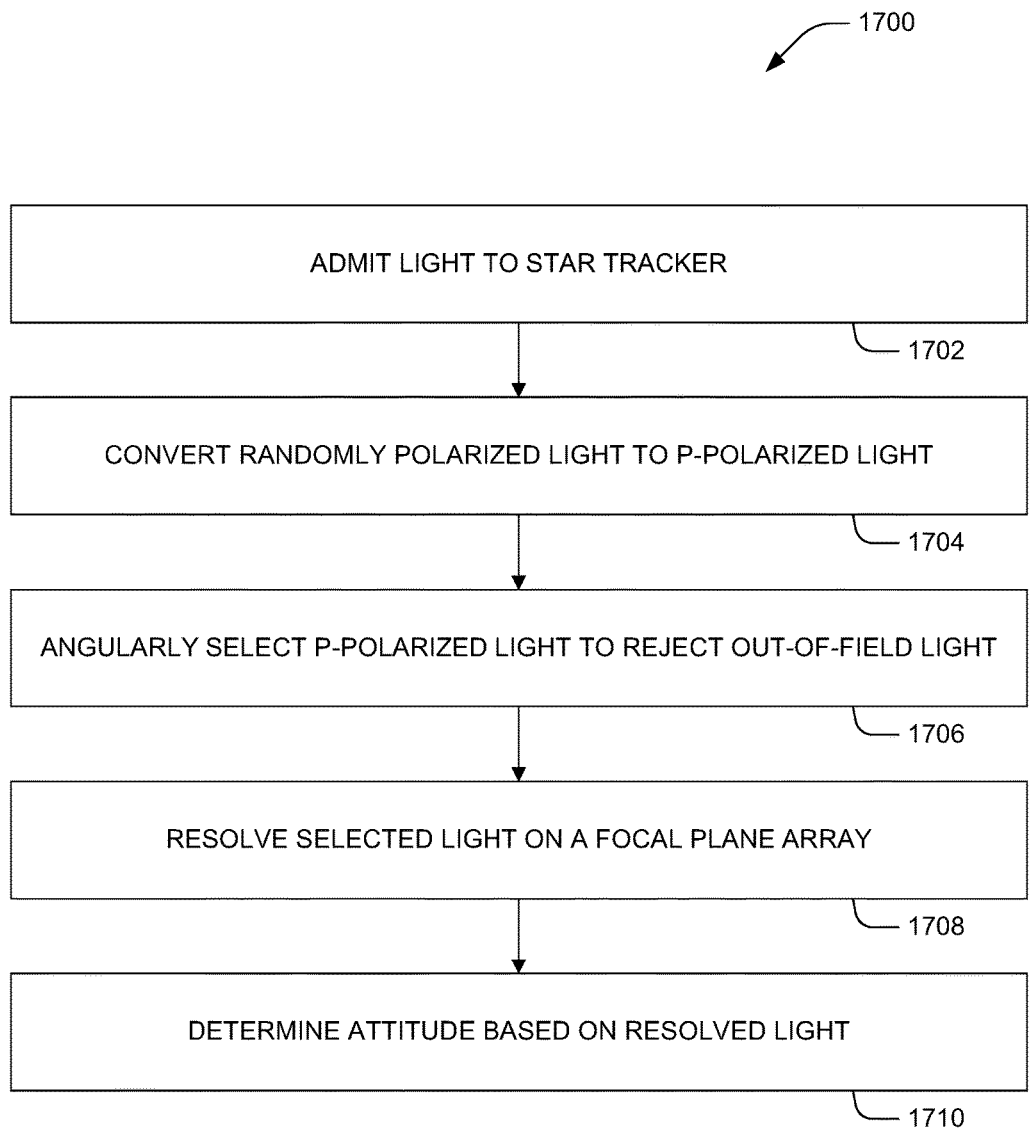
FIG. 17 is a flow chart of an example method of star tracking.

FIG. 17 is a flow chart depicting a method 1700 of star tracking that focuses particularly on the rejection of out-of-field light (e.g., in 1604 of FIG. 16). In method 1700, light can be admitted 1702 to a star tracker. To provide out-of-field rejection, incoming randomly polarized light can be converted 1704 to p-polarized light and the p-polarized light can be angularly selected 1706. Thus, out-of-field light can be rejected. The remaining selected (in-field) light can be resolved 1708 on a focal plane array and attitude of the star tracker can be determined 1710 based on the resolved light. Scattered light can occur in the polarization filter 1704. This light has two components, s-polarized light and p-polarized light. This light can scatter in a direction that is in the field of view of the telescope. The scattered p-polarized light will pass the angular selectivity, while scattered s-polarized light will be reflected. Light that is scattered into the FOV from the polarization conversion 1704 with an unfortunate p-polarization (i.e., light that will end up as background) can increase the background level on the focal plane, reducing the signal-to-noise ratio.

The weight of the star trackers described herein can be less than about 10 pounds per star tracker. Elimination of sun shades can result in a weight savings of about 9 pounds per star tracker, i.e., about 27 pounds for a three-tracker package.

Unless specified otherwise, as used in this disclosure, "about" is used to signify a tolerance of plus or minus five percent, and "based on" means "based at least in part on."

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A star tracker comprising:
   an out-of-field rejection filter comprising:
      a converter to convert randomly polarized light to p-polarized light; and
      an angular selectivity layer to select in-field p-polarized light and reject out-of-field p-polarized light;
   telescopic optics; and
   a focal plane array to resolve the selected light.

2. The star tracker of claim 1, further comprising an adaptive optical element (AOE) arranged to reduce centroiding error by adjusting focus of, or reducing aberrations in, selected light.

3. The star tracker of claim 1, wherein an interior side of the angular selectivity layer is reflective to s-polarized light and is arranged to reflect light from a calibration source within the star tracker to be resolved on the focal plane array.

4. The star tracker of claim 1, wherein at least a portion of the telescopic optics are diamond-turned optics.

5. The star tracker of claim 1, wherein the star tracker does not comprise, and is not coupled to, a sun shade.

6. The star tracker of claim 1, wherein the star tracker does not comprise, and is not coupled to, a sun shade longer than twenty centimeters.

7. The star tracker of claim 1, wherein the focal plane array is an active pixel array.

8. The star tracker of claim 1, wherein the converter and the angular selectivity layer are arranged at an angle of about 55° with respect to each other.

9. The star tracker of claim 1, wherein the angular selectivity layer are arranged to be flush with each other.

10. A multi-axis star tracker package comprising:
    a base;
    at least three star trackers mounted to the base, each having a boresight, each star tracker comprising:
       an out-of-field rejection filter comprising:
          a converter to convert randomly polarized light to p-polarized light; and
          an angular selectivity layer to select in-field p-polarized light and reject out-of-field p-polarized light;
       telescopic optics; and
       a focal plane array to resolve the selected light;
    wherein the boresights of the star trackers are arranged such that the star trackers have substantially non-overlapping fields of view.

11. The multi-axis star tracker package of claim 10, wherein the package comprises exactly three star trackers arranged to have an azimuth difference of about 120° between each star tracker.

12. The multi-axis star tracker package of claim 11, wherein each star tracker has a field of view of ±4.5° about a 55° angle relative to the base.

13. The multi-axis star tracker package of claim 10, wherein the package comprises exactly four star trackers arranged to have an azimuth difference of about 90° between each star tracker.

14. The multi-axis star tracker package of claim 10, wherein the package does not comprise any sun shade having a length greater than ten centimeters.

15. The multi-axis star tracker package of claim 10, wherein an interior side of an angular selectivity layer of at least one of the star trackers is reflective to s-polarized light and is arranged to reflect light from a calibration source within the star tracker to be resolved on the focal plane array.

16. A method of star tracking comprising:
    admitting light to a star tracker having an attitude;
    converting randomly polarized light in the admitted light to p-polarized light;
    angularly selecting the p-polarized light to reject out-of-field light;
    resolving the selected light on a focal plane array; and
    determining the attitude of the star tracker based on the resolved light.

17. The method of claim 16, further comprising:
    sensing that the Sun is in the field of view of the star tracker; and
    based on the sensing, activating at least one sun shutter in the star tracker to protect the focal plane array from damage.

18. The method of claim 16, further comprising:
    sensing that the Sun is in the field of view of the star tracker; and
    based on the sensing, adapting at least one adaptive optical element (AOE) in the star tracker to defocus direct sunlight to protect the focal plane array from damage.

19. The method of claim 16, further comprising reflecting calibration light off of an interior side of a filter used to angularly select the p-polarized light, the calibration light being resolved on the focal plane array.

20. The method of claim 19, wherein the selected light imaged on the focal plane array forms an uncalibrated image, the method further comprising performing focal plane calibration based on the calibration light illuminated on the focal plane array to derive a calibrated image from the uncalibrated image.

* * * * *